United States Patent [19]

Camberlin et al.

[11] Patent Number: 5,122,589
[45] Date of Patent: Jun. 16, 1992

[54] IMIDO/SILOXANE BISMALEIMIDE/AROMATIC DIAMINE PREPOLYMERS

[75] Inventors: Yves Camberlin, Caluire; Philippe Michaud, Lyons, both of France

[73] Assignee: Rhone-Poulenc Chimie, Courbevoie, France

[21] Appl. No.: 506,743

[22] Filed: Apr. 10, 1990

[30] Foreign Application Priority Data

Apr. 10, 1989 [FR] France .................. 89 04936

[51] Int. Cl.$^5$ .................. C08G 59/00; C08G 73/00; C08G 73/10
[52] U.S. Cl. .................. 528/322; 528/96; 528/170
[58] Field of Search .......... 528/96, 170, 322

[56] References Cited

U.S. PATENT DOCUMENTS 4,883,858  11/1989  Takemoto et al. ........... 528/170
4,959,443  9/1990  Yamaya et al. ............. 528/170

FOREIGN PATENT DOCUMENTS 0206383  12/1986  European Pat. Off. .
0284524  9/1988  European Pat. Off. .

*Primary Examiner*—John Kight, III
*Assistant Examiner*—T. Mosley
*Attorney, Agent, or Firm*—Burns, Doane, Swecker & Mathis

[57] ABSTRACT

Novel low melt viscosity imido prepolymers, well adapted for the production of prepregs and filament wound shaped articles, are prepared by copolymerizing (a) at least one N,N'-bismaleimide with (b) at least one siloxane bismaleimide, (c) at least one aromatic diprimary diamine, (d) optionally, at least one olefinically unsaturated comonomer other than a bisimide, (e) optionally, a catalyst, and (f) either an acrylate or an unhalogenated epoxy resin.

15 Claims, No Drawings

IMIDO/SILOXANE BISMALEIMIDE/AROMATIC DIAMINE PREPOLYMERS

BACKGROUND OF THE INVENTION

1. Field of the Invention

The present invention relates to novel imido polymers, and, more especially, to novel heat-curable imido prepolymers comprising siloxane bismaleimide recurring units which exhibit low melt viscosities.

2. Description of the Prior Art

French Patent Application FR-A-2,612,196 describes imido polymers which are prepared by reacting one or more conventional N,N'-bismaleimide(s) of the type described in French Patent FR-A-1,555,564 with one or more aromatic diprimary diamine(s), in the presence of a particular N,N'-bismaleimide comprising a diorganopolysiloxane moiety in its molecular structure and optionally another copolymerizable reactant and/or a catalyst.

With respect to the polyimides prepared according to French Patent FR-A-1,555,564 by heating a conventional N,N'-bismaleimide such as, for example, N,N'-4,4'-diphenylmethanebismaleimide, and an aromatic diamine, it has been established that the addition of an N,N'-bismaleimide comprising a diorganopolysiloxane group to the polymerization recipe permits enhancing the impact strength properties of the ultimate cured polymers.

SUMMARY OF THE INVENTION

A major object of the present invention is the provision of improved polyaminobismaleimides which are simultaneously resilient, useful for the production of articles by the filament winding technique, and also useful for the production of preimpregnated intermediate articles by impregnation of fibrous materials with prepolymers thereof in the molten state (known as the hot melt technique). The subject heat-curable polyaminobismaleimide prepolymers are prepared from N,N'-bismaleimides including an N,N'-bismaleimide comprising a diorganopolysiloxane moiety in its molecular structure, and which exhibit viscosities in the molten state of very low values; the change in those viscosities over time are perfectly adapted for such types of conversion as filament winding and solvent-free impregnation.

Briefly, it has now been determined that such prepolymers can be prepared by incorporating into a polymerization recipe comprising N,N'-bismaleimides including a siloxane N,N'-bismaleimide and at least one aromatic diprimary diamine, a particular supplementary additive which comprises either an acrylate reactant or an unhalogenated epoxy resin.

Thus, the present invention features heat-curable imido prepolymers having a very low viscosity in the molten state, measured under those conditions more fully described below, ranging from 0.1 Pa.s to 50 Pa.s, and which comprise the copolymerizates, in a homogeneous liquid medium at a temperature ranging from 50° C. to 180° C., of:

(a) at least one N,N'-bismaleimide having the formula:

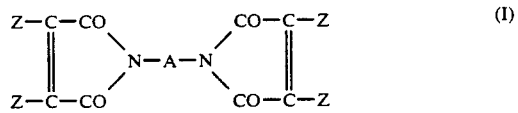

in which each of the symbols Z, which may be identical or different, is H, $CH_3$ or Cl; and the symbol A is a divalent radical selected from among the following: cyclohexylenes, phenylenes, 4-methyl-1,3-phenylene, 2-methyl-1,3-phenylene, 5-methyl-1,3-phenylene and 2,5-diethyl-3-methyl-1,4-phenylene, and the radicals of the formula:

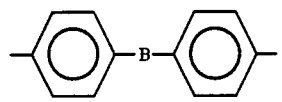

wherein B is a single valence bond or one of the groups:

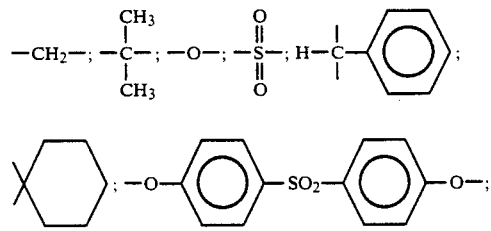

(b) at least one N,N'-bismaleimide comprising a diorganopolysiloxane moiety;

(c) at least one aromatic diprimary diamine;

(d) optionally, at least one comonomer other than a bisimide and containing one or more polymerizable carbon-carbon double bonds;

(e) optionally, a catalyst;

with the proviso that said at least one N,N'-bismaleimide (b) comprising a diorganopolysiloxane moiety has the following general formula:

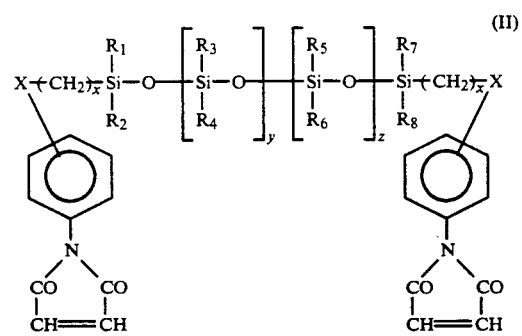

in which X, which is in an ortho, meta or para position in relation to the carbon atom of the benzene ring which is bonded to nitrogen, is a single valence bond or one of the following atoms or groups:

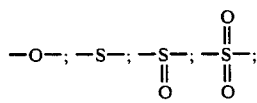

each of $R_1$, $R_2$, $R_3$, $R_4$, $R_5$, $R_6$, $R_7$ and $R_8$, which may be identical or different, is a monovalent hydrocarbon radical selected from among linear or branched chain alkyl radicals having from 1 to 12 carbon atoms, or substituted such alkyl radicals bearing one or more chlorine, bromine or fluorine substituents or by a —CN group; a phenyl radical optionally substituted by one or more alkyl and/or alkoxy radicals having from 1 to 4 carbon atoms or by one or more chlorine atoms; the symbol x is an integer ranging from 2 to 8; and the symbols y and z are identical or different, whole or fractional numbers, the sum of which ranges from 0 to 100;

with the proviso that said at least one aromatic diprimary diamine (c) comprises:

(c1) a compound having the general formula:

$$H_2N-D-NH_2 \qquad (III)$$

in which the symbol D is one of the divalent radicals represented by the symbol A in the formula (I), and wherein the symbols A and D contained in the same single polymer may be identical or different;

(c2) a compound having the general formula:

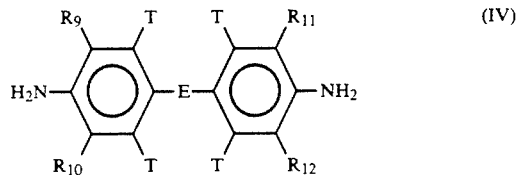

(IV)

in which each of the symbols $R_9$, $R_{10}$, $R_{11}$ and $R_{12}$, which may be identical or different, is a methyl, ethyl, propyl or isopropyl radical; each of the symbols T, which may be identical or different, is a hydrogen atom or a chlorine atom; and the symbol E is a divalent radical selected from among:

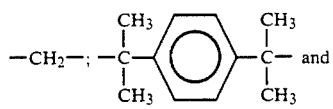

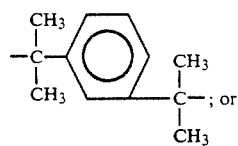

(c3) a compound having the general formula:

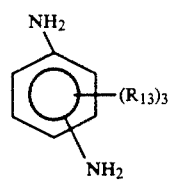

(V)

in which the amino radicals are in a meta or para position relative to each other; and each of the symbols $R_{13}$, which may be identical or different, is a methyl, ethyl, propyl or isopropyl radical;

and with the added proviso that said copolymerizates further include an additive (f) which comprises either an acrylate reactant (f1) or an unhalogenated epoxy resin (f2):

said acrylate reactant (f1) comprising at least one compound of the general formula:

$$(CH_2=CH\text{\textlbrackdbl}CO-O\text{\textrbrackdbl}\,O \qquad (VI)$$

in which the symbol $R_{14}$ is a hydrogen atom or a methyl radical; n is a whole or fractional number equal to at least 1 and not greater than 8; and the symbol G is an organic radical or valency n which comprises a linear or branched chain, saturated aliphatic radical having from 1 to 30 carbon atoms and which may contain one or more oxygen bridges and/or one or more free hydroxyl functional groups; or an aryl or arylaliphatic radical having from 6 to 150 carbon atoms and including a benzene nucleus which may be substituted by one to three alkyl radicals having from 1 to 5 carbon atoms, or a plurality of benzene nuclei optionally substituted as indicated above, bonded together by a single valence bond, an inert group or an alkylene radical having from 1 to 3 carbon atoms, with the proviso that said aromatic radical may also contain one or more bridging oxygen atoms and/or one or more free hydroxyl functional groups, and wherein the free valency (valencies) of the aromatic radical G may be satisfied by a carbon atom of an aliphatic radical and/or by a carbon atom of a benzene nucleus;

and said unhalogenated epoxy resin (f2) comprising an epoxy resin having an epoxy equivalent weight ranging from 100 to 500 and which comprises a glycidyl ether prepared by reacting epichlorohydrin with a divalent polyphenol selected from among bis(hydroxyphenyl)alkanes such as 2,2-bis(4-hydroxyphenyl)propane, bis(4-hydroxyphenyl)methane, bis(4-hydroxyphenyl)-methylphenylmethane or bis(4-hydroxyphenyl)-tolylmethanes; resorcinol, hydroquinone, pyrocatechol, 4,4'-dihydroxydiphenyl, and the products of condensation of the above-mentioned phenols with an aldehyde.

DETAILED DESCRIPTION OF THE PREFERRED EMBODIMENTS OF THE INVENTION

More particularly according to the present invention, exemplary of the above bismaleimides (a) of formula (I), the following are especially representative:

N,N'-Meta-phenylenebismaleimide;
N,N'-Para-phenylenebismaleimide;
N,N'-4,4'-Diphenylmethanebismaleimide;
N,N'-4,4'-Diphenyl ether bismaleimide;
N,N'-4,4'-Diphenyl sulfone bismaleimide;
N,N'-1,4-Cyclohexylenebismaleimide;
N,N'-4,4'-(1,1-Diphenylcyclohexane)bismaleimide;
N,N'-4,4'-(2,2-Diphenylpropane)bismaleimide;
N,N'-4,4'-Triphenylmethanebismaleimide;
N,N'-2-Methyl-1,3-phenylenebismaleimide;
N,N'-4-Methyl-1,3-phenylenebismaleimide; and
N,N'-5-Methyl-1,3-phenylenebismaleimide.

These bismaleimides can be prepared according to the processes described in U. S. Pat. No. 3,018,290 and British Patent GB-A-1,137,290. According to the present invention, N,N'-4,4'-diphenylmethanebismaleimide is preferred, either alone or mixed with N,N'-2-methyl-1,3-phenylenebismaleimide, N,N'-4-methyl-1,3-phenylenebismaleimide and/or N,N'-5-methyl-1,3-phenylenebismaleimide.

With regard to the siloxane bismaleimides (b) of formula (II), when y and/or z are greater than 1, a polymeric structure exists that can be a single compound, but in most cases is a mixture of different compounds having the same chemical structure, which differ in the number of recurring units in their molecule; this imparts an average value of y and/or z which may be whole or fractional.

When the preparation of the prepolymers according to the invention is carried out, as more fully described below, in an organic diluent or solvent, any one of the compounds of formula (II) can be employed.

Exemplary bismaleimides which are suitable are those of the formula (II) in which: (1) $X = -O-$; $R_1 = R_2 = R_3 = R_4 = R_5 = R_6 = R_7 = R_8 =$ linear alkyl radical having from 1 to 3 carbon atoms; $x = 2, 3$ or 4; $y + z$ ranges from 0 to 100 and preferably from 4 to 70;

(2) $X = -O-$; $R_1 = R_2 = R_3 = R_4 = R_7 = R_8 =$ linear alkyl radical having from 1 to 3 carbon atoms; $R_5 = R_6 =$ phenyl radical; $x = 2, 3$ or 4; $y + z$ ranges from 0 to 100 and preferably from 4 to 70;

(3) $X = -O-$; $R_1 = R_2 = R_7 = R_8 =$ linear alkyl radical having from 1 to 3 carbon atoms; $R_3 = R_4 = R_5 = R_6 =$ phenyl radical; $x = 2, 3$ or 4; $y + z$ ranges from 0 to 100 and preferably from 4 to 70;

(4) $X = -O-$; $R_1 = R_2 = R_3 = R_5 = R_7 = R_8 =$ linear alkyl radical having from 1 to 3 carbon atoms; $R_4 = R_6 =$ phenyl radical; $x = 2, 3$ or 4; $y + z$ ranges from 0 to 100 and preferably from 4 to 70;

(5) $X = -O-$; $R_1 = R_3 = R_5 = R_7 =$ linear alkyl radical having from 1 to 3 carbon atoms; $R_2 = R_4 = R_6 = R_8 =$ phenyl radical; $x = 2, 3$ or 4; $y + z$ ranges from 0 to 100 and preferably from 4 to 70.

As specific examples of siloxane bismaleimides (b) which are suitable, especially representative are those of the formulae:

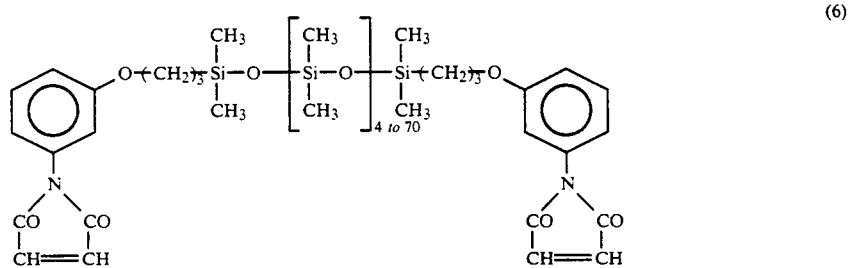

(6)

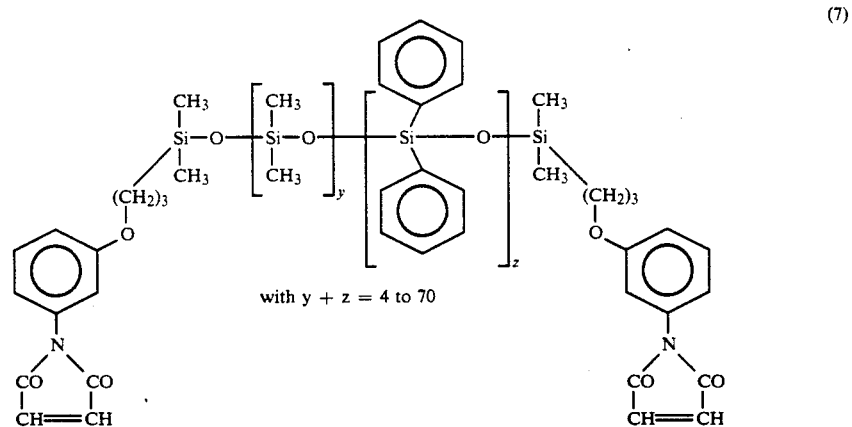

(7)

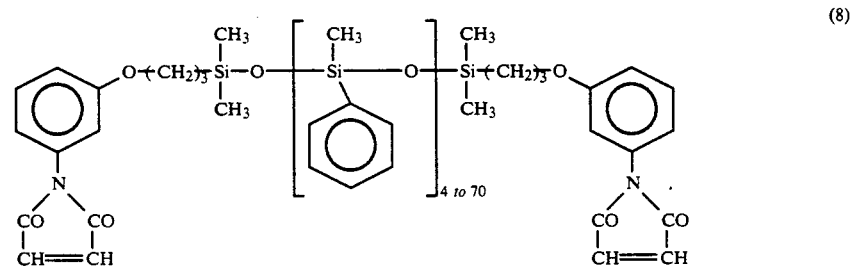

(8)

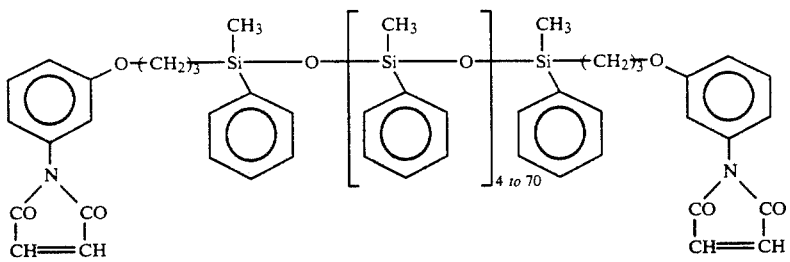
(9)

When the preparation of the polymers according to the invention is carried out in bulk, the bismaleimides of formula (II) preferably employed are those wherein the diorganopolysiloxane moiety comprises a plurality of Si-phenyl or Si-substituted phenyl groups. Bismaleimides of this type which are particularly suitable are those of the following categories, ranked in order of increasing preference:

(i) bismaleimides Nos. 2, 3, 4 and 5;
(ii) bismaleimides Nos. 7, 8 and 9.

The siloxane bismaleimides of formula (II) are compounds which are prepared by reacting maleic anhydride, in the presence of a dehydrating agent, of a tertiary amine, of an organic diluent and of a catalyst, with a diamine comprising a diorganopolysiloxane moiety and having the formula:

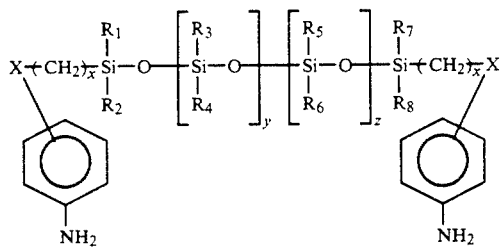

in which X, $R_1$, $R_2$, $R_3$, $R_4$, $R_5$, $R_6$, $R_7$, $R_8$, x, y and z are as defined above for the formula (II). Further description of such siloxane bismaleimides and a process for the preparation thereof are particularly set forth in French Patent Application FR-A-2,611,728.

By way of specific examples of diamines (c1) of formula (III), particularly representative are the following:
Para-phenylenediamine;
Meta-phenylenediamine;
4,4′-Diaminodiphenylmethane;
2,2-Bis(4-aminophenyl)propane;
Benzidine;
Bis(4-aminophenyl)ether; and
4,4′-Diaminodiphenyl sulfone.
4,4′-Diaminodiphenylmethane is preferably employed according to the present invention.

As specific examples of hindered diamines (c2) and (c3) of formulae (IV) and (V), particularly representative are:
4,4′-Diamino-3,3′,5,5′-tetramethyldiphenylmethane;
4,4′-Diamino-3,3′,5,5′-tetraethyldiphenylmethane;
4,4′-Diamino-3,5-dimethyl-3′,5′-diethyldiphenylmethane;
4,4′-Diamino-3,3′-diethyl-5,5′-dimethyldiphenylmethane;
4,4′-Diamino-3,3′,5,5′-tetraisopropyldiphenylmethane;
4,4′-Diamino-3,3′-diisopropyl-5,5′-dimethyldiphenylmethane;
1,4-Bis(4-amino-3,5-dimethyl-α,α-dimethylbenzyl)benzene;
1,3-Bis(4-amino-3,5-dimethyl-α,α-dimethylbenzyl)benzene;
1,3-Diamino-2,4-diethyl-6-methylbenzene; and
1,3-Diamino-2-methyl-4,6-diethylbenzene.

These hindered diamines can be prepared according to the processes described in British Patent GB-A-852,651 and U.S. Pat. No. 3,481,900. According to the present invention, 4,4′-diamino-3,3′,5,5′-tetramethyldiphenylmethane, 4,4′-diamino-3,3′,5,5′-tetraethyldiphenylmethane, 4,4′-diamino-3,3′-diethyl-5,5′-dimethyldiphenylmethane and mixtures thereof are the preferred.

Exemplary of the acrylate reactant (f1), the following are particularly representative:

(f1.1) the mono(meth)acrylates corresponding to the formula (VI) in which:
n=1, and
G is a monovalent organic radical of the formula:

$$-CH_2CH_2O)_mG_1 \qquad (VII)$$

in which $G_1$ is a linear or branched chain alkyl radical having from 1 to 6 carbon atoms or a phenyl radical, and m is an integer equal to zero, 1, 2, 3, 4 or 5;

(f1.2) the di(meth)acrylates corresponding to the formula (VI) in which:
n=2, and
G is a divalent organic radical of the formula:

$$-CH_2CH_2O)_pG_2-OCH_2CH_2)_q \qquad (VIII)$$

in which $G_2$ is a linear or branched chain alkylene divalent radical having from 2 to 9 carbon atoms and optionally comprising one or more oxygen bridges or a radical of the formula:

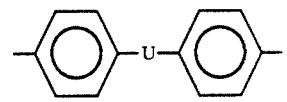

in which the symbol U is a single valence bond or one of the groups:

$-CH_2-$; $-CH_2-CH_2$; $-CH(CH_3)CH_2-$;

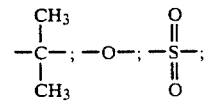

wherein each of the symbols p and q, which may be identical or different, is an integer equal to zero, 1, 2, 3, 4 or 5;

(f1.3) the tri- and tetra(meth)acrylates having the formula (VI) in which:

n=3 or 4, and

G is a trivalent or tetravalent organic radical derived from a linear or branched chain saturated aliphatic residue having from 3 to 20 carbon atoms and optionally comprising one or more oxygen bridges and/or one or more free hydroxyl functional groups;

(f1.4) the novolak epoxy(meth)acrylates which, while corresponding to the formula (VI), here have the following specific formula:

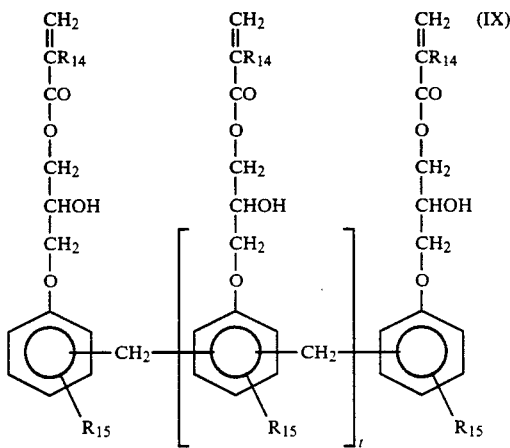

in which the symbol $R_{14}$ is as defined above in connection with the formula (VI); the symbol $R_{15}$ is a hydrogen atom or a methyl radical; and t is a whole or fractional number ranging from 0.1 to 7; and (f1.5) mixtures of a number of acrylates and/or methacrylates of the same single type [(f1.1), (f1.2), (f1.3) or (f1.4)] with each other or mixtures of one or more acrylate(s) and/or methacrylate(s) of the same single type with one or more acrylate(s) and/or methacrylate(s) of another type.

Exemplary of the acrylate reactant (f1.1), particularly representative are the methyl mono(meth)acrylates, (monooxyethylated)phenol mono(meth)acrylates, and (dioxyethylated)phenol mono(meth)acrylates.

Exemplary of the acrylate reactant (f1.2), particularly representative are ethylene glycol di(meth)acrylates, 1,4-butanediol di(meth)acrylates, 1,6-hexanediol di(meth)acrylates, tripropylene glycol di(meth)acrylates; and di(meth)acrylates of the following diphenols, di(mono- or polyoxyethylated) or otherwise: 4,4'-dihydroxydiphenylmethane, bisphenol A, 4,4'-dihydroxydiphenyl ether, and, in particular, the di(meth)acrylates of di(monooxyethylated)bisphenol A or the di(meth)acrylates of di(dioxyethylated)bisphenol A [cf. formula (VIII) in which $G_2$ denotes the radical:

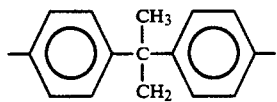

and p=q=1 or 2].

Exemplary of the acrylate reactant (f1.3), particularly representative are 1,2,4-butanetriol tri(meth)acrylates, 1,2,6-hexanetriol tri(meth)acrylates, trimethylolpropane tri(meth)acrylates, pentaerythritol tri(meth)acrylates and pentaerythritol tetra(meth)acrylates.

The novolak epoxy(meth)acrylates (f1.4) are known materials, certain of which are available commercially. They can be prepared by reacting (meth)acrylic acids with an epoxy resin of the novolak type, the latter being the product of reaction of epichlorohydrin and of phenol/formaldehyde polycondensates [in the formula (IX) given above, $R_{15}$ is then a hydrogen atom] or of cresol/formaldehyde polycondensates [in said formula, $R_{15}$ is then a methyl radical]. These oligomeric polyacrylates (f1.4) and a process for the preparation thereof are described, for example, in U.S. Pat. No. 3,535,403.

Exemplary of the acrylate reactant (f1.4), particularly representative are the novolak epoxy acrylates of formula (IX) in which $R_{14}$ and $R_{15}$ are each a hydrogen atom and t is a whole or fractional number ranging from 0.1 to 5.

And exemplary of the acrylate reactant (f1.5), particularly representative are mixtures of novolak epoxy(meth)acrylates (f1.4) with not more than 30% by weight, based on the weight of the mixture (f1.4)+(f1.3), of a triacrylate and/or of a trimethacrylate corresponding to the definitions given above in connection with the acrylate reactant (f1.3) and, in particular, the mixtures of the suitable novolak epoxy acrylates referred to immediately above with not more than 25% by weight, relative to the weight of the mixture, of a suitable triacrylate and/or of a trimethacrylate selected from those mentioned immediately above.

The acrylate reactant (f1) which is preferably used is selected from among di(monooxyethylated)bisphenol A di(meth)acrylates, di(dioxyethylated)bisphenol A di(meth)acrylates, the novolak epoxy acrylates of formula (IX) in which $R_{14}$ and $R_{15}$ are each a hydrogen atom and t is a whole or fractional number ranging from 0.1 to 5, these compounds being used alone or mixed with not more than 25% by weight, relative to the weight of the mixture, of trimethylolpropane triacrylate.

With regard to the epoxy resin (f2), by the expression "epoxy equivalent weight" given above is intended the weight of resin (in grams) containing one epoxy functional group.

An epoxy resin which has an epoxy equivalent weight ranging from 150 to 300 is preferred. As regards the physical characteristics of this resin, these range from those of liquid resins of low viscosity (approximately $2 \times 10^{-3}$ Pa.s at 25° C.) to those of pasty resins having a melting point on the order of 60° C. The preferred resins are the glycidyl ethers of bis(hydroxyphenyl)alkanes referred to above in connection with the detailed description of the resin (f2).

In some cases it may be advantageous to modify the prepolymers according to the present invention by also incorporating a copolymerizable reactant (d). As an optional reactant (d) which is suitable, particularly representative are:

(1) when it is desired, for example to lower the fluidity of the reaction mixture:

(d1) either one or more monomer(s) of the formula:

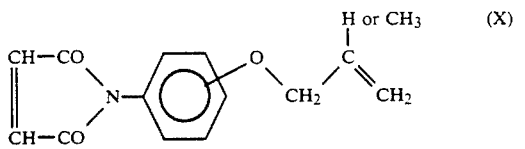

in which the allyloxy or methallyloxy radical is in an ortho, meta or para position in relation to the carbon atom of the benzene ring which is bonded to nitrogen; or (d2) a compound comprising a mixture of (i) a monomer of the formula:

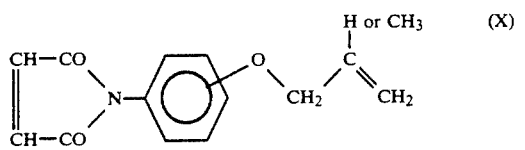

in which the allyloxy or methallyloxy radical is in an ortho, meta or para position in relation to the carbon atom of the benzene ring which is bonded to nitrogen, with: (ii) at least one monosubstituted derivative of the formula:

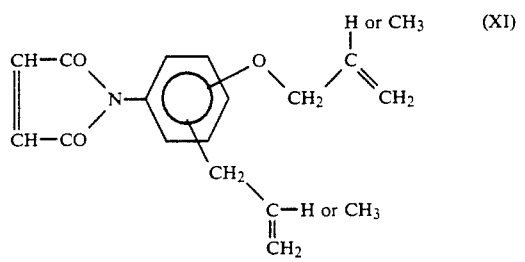

and optionally with (iii) one or more disubstituted derivative(s) of the formula:

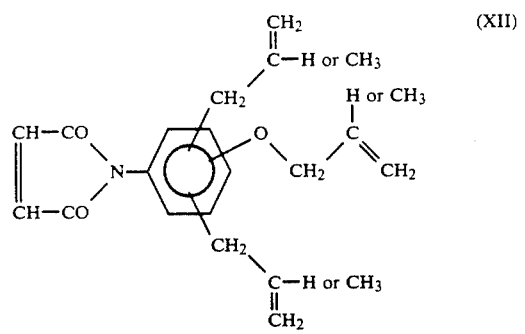

In the above-mentioned compound employed as reactant (d2), the proportions of the various constituents of the mixture of the compounds of formulae (X), (XI) and optionally (XII) may vary over wide limits. In general, the proportions of the constituents are selected within the following limits (expressing the weight percentage of each of the constituents in the mixture):

at least 30%, and preferably from 50% to 80%, of N-(meth)allyloxyphenylmaleimide of formula (X), from 5% to 50%, and preferably from 10% to 35%, of mono(meth)allyl substituted derivative(s) of formula (XI), and from 0% to 20%, and preferably from 0% to 15%, of di(meth)allyl substituted derivative(s) of formula (XII), with the sum of the constituents in each case having to be equal to 100% by weight;

(2) when it is desired, for example, to further improve the flexural properties at elevated temperature:

(d3) one or more substituted heterocyclic ring(s) containing one or more carbon-carbon double bond(s).

It should be appreciated that mixtures of reactants (d1)+(d3) or (d2)+(d3) can be employed as the optional reactant (d).

With regard to the optional reactant (d1), this advantageously comprises:

N-(2-Allyloxyphenyl)maleimide;
N-(3-Allyloxyphenyl)maleimide;
N-(4-Allyloxyphenyl)maleimide;
N-(2-Methallyloxyphenyl)maleimide;
N-(3-Methallyloxyphenyl)maleimide;
N-(4-Methallyloxyphenyl)maleimide; and mixtures thereof.

The maleimides of formula (X) are known compounds which are described in European Patent Application EP-A1-0,208,634.

With regard to the optional reactant (d2), the crude product produced by the process described in European Patent Application EP-A-0,274,967 is preferably employed as the compound comprising a mixture of N-(meth)allyloxyphenylmaleimide of formula (X) with one or more (meth)allylated substitution derivatives of formula(e) (XI) and optionally (XII).

With regard to the optional reactant (d3), this is advantageously selected from among: vinyl pyridines, N-vinylpyrrolidone, allyl isocyanurate, triallyl isocyanurate, vinyltetrahydrofuran and mixtures thereof.

The reactivity of the constituents of the reaction mixture according to the invention can be increased, if required, by the addition of a catalyst (e), which may be either (e1) a radical polymerization initiator such as, for example, dicumyl peroxide, lauroyl peroxide or azobisisobutyronitrile, or (e2) an imidazole compound.

The said imidazole compound (e2) advantageously has the general formula:

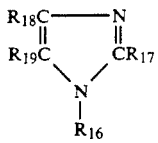

in which each of $R_{16}$, $R_{17}$, $R_{18}$ and $R_{19}$, which may be identical or different, is a hydrogen atom, an alkyl or alkoxy radical having from 1 to 20 carbon atoms, or a vinyl, phenyl or nitro radical, with the proviso that $R_{18}$ and $R_{19}$ may together form, with the carbon atoms from which they depend, a single ring member such as, for example, a benzene ring, and with the further proviso that $R_{16}$ may comprise a carbonyl group bonded to a second imidazole ring.

As specific examples of optional imidazole compounds (e2), particularly representative are imidazole or glyoxaline, 1-methylimidazole, 2-vinylimidazole, 1,2-dimethylimidazole, 1-vinylimidazole, 1-vinyl-2-methylimidazole, benzimidazole and carbonyldiimidazole.

The preferred prepolymers in accordance with the present invention are those which comprise the polymerizate of:

(i) one or more conventional N,N'-bismaleimide(s) (a) of formula (I);

(ii) a siloxane N,N'-bismaleimide (b) of formula (II);

(iii) one or more hindered diprimary diamine(s) (c2) and/or (c3) of formula(e) (IV) and/or (V);

(iv) one or more substituted heterocyclic ring(s) (d3) containing one or more carbon-carbon double bond(s); and (v) an acrylate reactant (f1) or an epoxy resin (f2).

The preferred polymers are not only those described immediately above, but also those comprising the various preferred embodiments described earlier.

In the heat-curable prepolymers described above, the amounts of reactants (a) and (c) are selected such as to generally provide, by weight relative to the total weight of these constituents:

from 50% to 98%, and preferably from 70% to 90%, of bismaleimide(s) (a) of formula (I); and from 2% to 50%, and preferably from 10% to 30%, of diamine(s) (c) of formulae (III), (IV) and/or (V).

With regard to the amount of siloxane bismaleimide (b) of formula (II), this generally represents less than 40%, and preferably from 5% to 30%, of the total weight of the reactants (a)+(c).

With regard to the amount of optional reactant (d), this generally represents less than 60%, and preferably from 5% to 50%, of the total weight of the reactants (a)+(c).

With regard to the optional catalyst (e), depending on its nature ad depending on the desired rate of polymerization at the processing stage, it is generally employed in a proportion ranging from 0.01% to 1% by weight relative to the total weight of the reactants (a)+(b)+(c)+optionally (d) and, preferably, ranging from 0.05% to 0.5%.

With regard to the required additive (f), comprising an acrylate reactant (f1) or an epoxy resin (f2), this is advantageously employed in an amount which generally represents from 1% to 60%, and preferably from 5% to 30%, of the weight of the total weight of the constituents (a)+(b)+(c)+(f)+optionally (d).

Various adjuvants may be incorporated in the prepolymers according to the invention. These adjuvants, which are typical and are well known to this art, may be, for example, stabilizers or degradation inhibitors, lubricants or demolding agents, colorants or pigments, pulverulent or particulate fillers such as silicates, carbonates, kaolin, chalk, powdered quartz, mica or ballotini. It is also possible to incorporate adjuvants which modify the physical structure of the product obtained, such as, for example, blowing agents or fibrous reinforcing agents, such as, especially, carbon, polyimide or aromatic polyamide fibrils, or whiskers.

The process for the preparation of the prepolymers of the invention is such that they are ready for use and exhibit sufficient flexibility and adhesiveness as a thin layer.

In a preferred embodiment for preparing the imido polymers of the invention an intimate mixture of the bismaleimide(s) (a) and of the amine reactant (c) is produced first. To prevent a premature homopolymerization of the maleimides, which would result in an excessively viscous resin, the mixture (a)+(c) is melted, in the absence of the optional catalyst (e). This operation is carried out under stirring and at a temperature not exceeding the melt temperature of that maleimide which is the most difficult to liquefy, generally ranging from 50° to 180° C., and preferably from 80° C. to 170° C., until a homogeneous liquid mixture is obtained (stage 1).

The following constituents are then added in succession to the molten mixture, which is stirred and maintained at a temperature identical with or different from that used in the preceding stage, generally ranging from 50° C. to 180° C., and preferably from 80° C. to 170° C.: in a first step, the siloxane bismaleimide (b), then, in a second step, the additive (f), with care being taken to maintain a homogeneous liquid mixture; and, once this additive has been introduced, the prepolymer formed is immediately withdrawn from the reactor used for the preparation thereof (stage 2).

In the event that the optional reactant (d) and/or the optional catalyst (e) are used, these are generally introduced at the beginning of stage 2 (into the molten mixture which, as indicated above, is stirred and maintained at a temperature identical with or different from that used in stage 1, ranging from 50 C to 180° C., and preferably from 80° C. to 170° C.) before the introduction of the other constituents (b) and (f) of the reaction mixture. Precautions will be taken in this case to permit the reaction mixture to react under stirring for a period of time ranging, for example, from 1 minute to 15 minutes, before introducing the other constituents (b) and (f).

The melt viscosity of the prepolymers thus obtained can be easily adjusted to the desired value, which ranges from 0.1 Pa.s to 50 Pa.s, especially by modifying the nature and the respective proportions of the reactants used and the temperature and the duration of the various stages of the process of manufacture described above.

The above process can be carried out not only in a melt, but also in the presence of variable amounts of a polar liquid such as, for example: cresol, dimethylformamide, N-methylpyrrolidone, dimethylacetamide, methyl ethyl ketone, dioxane or cyclohexanone.

In the homogeneous liquid state, the prepolymers according to the invention can be directly used, for example for impregnating conductors or for producing moldings merely by hot casting. It is also possible, after cooling and grinding, to employ these prepolymers in the form of powders, for example to produce compression-molded shaped articles, optionally in combination with fibrous or pulverulent fillers. The prepolymers can also be employed in solution for the preparation of coatings, of adhesive bondings, of laminated materials comprising woven or nonwoven sheets, of one-directional elements or of natural or synthetic chopped fibers, such as, for example, filaments or fibers made of glass, boron, carbon, tungsten, silicon, polyamideimide or aromatic polyamide.

The prepolymers according to the present invention are of very particular interest for the production of solvent-free preimpregnated intermediate articles. The impregnation of the fibrous material can be carried out by the usual techniques such as immersion, knife or curtain coating, or impregnation by transfer. The transferable film and the preimpregnated articles can be employed directly or can be stored for subsequent use; their properties are preserved remarkably well over the course of cold storage at a temperature of from 0 to 10° C. The prepolymers employed for this application preferably have a melt viscosity ranging from 2 Pa.s to 50 Pa.s.

The preimpregnated materials can be used for the production of components of various shapes and functions in many industries such as, for example, in aeronautics. These components, which may be articles of revolution, are produced by stacking a plurality of layers of prepregs onto a former or a support.

The crosslinking is then carried out under the usual technological conditions relating to composite materials, and in particular at temperatures ranging from 100° to 300° C.

The prepregs can also be employed as reinforcements, or means for repairing deteriorated or damaged articles.

However, it is also possible to produce articles by the filament winding technique with or without a support, a technique for the production of articles of revolution, and used especially for making components for the automotive and aeronautics industries. The prepolymers used in this particular technique preferably have a melt viscosity ranging from 0.1 Pa.s to 2 Pa.s.

In order to further illustrate the present invention and the advantages thereof, the following specific examples are given, it being understood that same are intended only as illustrative and in nowise limitative.

In said examples to follow, a number of tests and measurements were carried out. Various properties were also measured. The operating procedures and/or the standards according to which these tests and measurements were carried out are as set forth below.

MELT VISCOSITY OF THE PREPOLYMER

The melt viscosity as referred to herein was the dynamic viscosity of the prepolymer obtained at the time of casting, upon completion of the process carried out in bulk; it was measured at 80° C.±0.1° C. using a Contraves Rheomat 30 viscometer equipped with a rotor rotating at a rate of 13 s$^{-1}$; its value is reported in Pa.s.

SOFTENING POINT OF THE PREPOLYMER

The softening point is the approximate temperature at which a glass rod 6 mm in diameter can easily be penetrated a few mm into the prepolymer.

GLASS TRANSITION TEMPERATURE OF THE CURED POLYMER

The glass transition temperature (Tg) corresponds to the abrupt drop in the modulus of elasticity as a function of temperature. It was determined on a graph plotting the variation in the modulus of elasticity as a function of temperature, variations which were measured using dynamic mechanical analysis, with the aid of a Dupont DMA model 982 apparatus, at a rate of temperature increase of 3° C./min. The test specimens were conditioned at RHO (zero relative humidity), i.e., they were placed in a desiccator over silica gel and dried for 24 hours at ambient temperature at 0.66–1.33×10$^2$ Pa before the measurements were carried out.

FLEXURAL MECHANICAL CHARACTERISTICS OF THE CURED POLYMER

The determination of the flexural modulus (Mf) and of the rupture strength (Sr) was carried out on bar-type test specimens conditioned at RHO, according to ASTM Standard D 790M. The results are given in MPa.

TENSILE MECHANICAL CHARACTERISTICS OF THE CURED POLYMER

These were determined on dumbbell-type test specimens, conditioned at RHO, according to ASTM Standard D 638M.

CHARPY IMPACT STRENGTH OF THE CURED POLYMER

This was determined at 20° C. on unnotched 80×10×4 mm bar-type test specimens, conditioned at RHO, according to ASTM Standard D 256. The results are given in kJ/m$^2$.

EXAMPLE 1

1. Example according to the present invention:

The following constituents were introduced at ambient temperature into a glass reactor fitted with an anchor-type stirrer:

(i) 80 g (0.223 moles) of N,N'-4,4'-diphenylmethanebismaleimide; and (ii) 20 g (0.064 moles) of 4,4'-diamino-3,3',5,5'-tetraethyldiphenylmethane.

Stage 1: The reactor was immersed in an oil bath preheated to 160° C. and the mixture was stirred until the ingredients introduced had completely melted and a homogeneous liquid mass had been obtained. This stage was carried out for 5 minutes.

Stage 2: The molten mixture obtained was cooled to 120° C. and 8 g of N-vinyl-2-pyrrolidone were introduced, and the entire mass was then permitted to react for 8 minutes, under stirring.

20 g (0.0159 moles) of the bismaleimide containing a diorganopolysiloxane group, which is described in section 2 below, were then added to the reaction mass under stirring and at 120° C.

16 g of di(dioxyethylated) bisphenol A diacrylate were then added to the reaction mass, always under stirring and maintained at 120° C., this compound being commercially available under the registered trademark Ebecryl 150 of the UCB company, and the reaction mass, in a homogeneous liquid bulk state, was immediately cast into a mold preheated to 150° C.

The prepolymer thus obtained was flexible and tacky at ambient temperature (20° C.). It had a softening point of approximately 5° C. Its viscosity at 80° C. was 3 Pa.s.

Using this prepolymer, impregnation of the hot-melt type (with solvent-free molten prepolymer) of fibrous materials based, for example, on woven carbon fiber sheets, to make preimpregnated intermediate articles, was possible in the temperature range of from 80° to 100° C.

By immediately casting the prepolymer into a mold, as indicated above, it was possible to prepare plaques 140×100×4 mm in size, which were then subjected to the following curing cycle:
60 minutes at 140° C.;
100 minutes between 140° C. and 250° C.;
16 hours at 250° C.; and
2 hours between 250° C. and 25° C.

After demolding, the plaques based on the cured polymer were cut to produce test specimens of appropriate dimensions, which were used to measure the following: the glass transition temperature (Tg), the flexural modulus (Mf), the flexural rupture strength (Sr), the unnotched Charpy impact strength (Si) and the tensile elongation at break (Eb).

The values determined were the following:

| | | |
|---|---|---|
| Tg: | 290° C., | |
| Mf: | at 20° C.: | 3,300 MPa, |
| | at 250° C.: | 1,500 MPa, |
| Sr: | at 20° C.: | 130 MPa, |
| | at 250° C.: | 60 MPa. |

| Si: | at 20° C.: | 17 kJ/m², |
| Eb: | at 20° C.: | 2.7%. |

For purposes of comparison, the operations described above were reproduced, but without using any acrylate reactant. The prepolymer obtained in these conditions had a softening point of 50° C. and a viscosity at 80° C. which was on the order of 100 Pa.s. This made it difficult to employ such prepolymer for producing solvent-free preimpregnated intermediate articles (the prepolymer was too viscous and the impregnation of the fibers resulted in a considerable distortion of the sheet, which militates against such an application).

2. Process for the preparation of the bismaleimide containing a diorganopolysiloxane group and employed in Example 1:

This bismaleimide had the following formula:

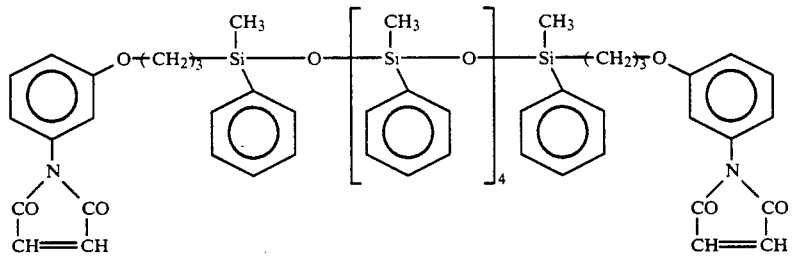

2.1. Preparation of the diamine containing a diorganopolysiloxane group from which the above bismaleimide was derived:

369 g (0.46 moles) of an alpha,omega-bis(hydro)diorganopolysiloxane of the formula:

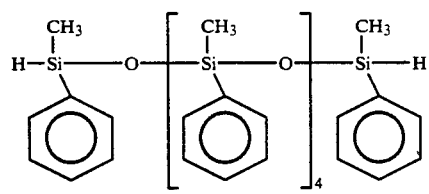

which had a reaction mass on the order of 802 g were charged into a glass reactor fitted with a central stirrer, a dropping funnel and a reflux condenser, in which a slight overpressure of dry nitrogen was established.

The reactor was then placed into an oil bath preheated to 55° C. and the catalyst was then added. The latter was the Karsted catalyst (complex based on elemental platinum and on 1,3-divinyl-1,1,3,3-tetramethyldisiloxane ligands): it was in solution in toluene (concentration of 3.5% by weight) and 1.49 cm³ of this catalyst solution were introduced with a syringe; the ratio (weight of elemental platinum introduced/weight of the reaction mass) was equal to $91 \times 10^{-6}$.

137 g (0.92 moles) of meta-allyloxyaniline were then gradually introduced into the reactor over a period of 5 minutes, such as to control the exothermicity of the reaction. Thirty minutes after completion of the addition, the reaction mixture returned to ambient temperature. The product obtained, 506 g in weight, was a clear viscous oil, orangy-brown in color, exhibiting a proton NMR spectrum in agreement with the structure:

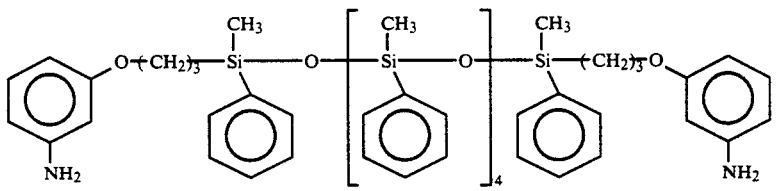

The molecular weight was on the order of 1,100. Under these conditions, the degree of conversion of the reactants introduced was 100% (neither amine nor hydrogenated siloxane oligomer was detected by NMR and infrared analysis) and the weight yield of the desired diamine was 100%.

2.2. Preparation of the diorganopolysiloxanebismaleimide:

The following materials were introduced simultaneously over 10 minutes, with the aid of 2 dropping funnels, into a glass reactor fitted with a central stirrer and with a reflux condenser, in which a slight overpressure of dry nitrogen was established and which was placed in an oil bath preheated to 55° C.:

(i) 20 cm³ of an acetone solution of 28 g (0.025 moles and 0.02 NH₂ functional groups) of the siloxane diamine prepared in section 2.1;

(ii) 15 cm³ of an acetone solution of 6.4 g (0.055 moles) of maleic anhydride.

When the additions were complete, each funnel was rinsed with 5 cm³ of acetone, which were then added to the reaction mass, which was maintained stirred for an additional 15 minutes.

6.1 g (0.06 moles) of acetic anhydride were charged into the dropping funnel which contained maleic anhydride, and 1.67 g (0.0165 moles) of triethylamine were charged into the other funnel.

These two compounds were then introduced into the reactor, and 0.3 cm³ of an aqueous solution containing 0.0528 moles of nickel acetate per 100 cm³ of solution was then added.

The reaction mixture was maintained under reflux with stirring for 2 hours, 30 minutes. The temperature was then decreased to 20° C.

The reaction mixture was diluted with 80 cm³ of iced water (5° C.) with vigorous stirring, and the oily product present was then extracted with 80 cm³ of ethyl acetate. The organic phase obtained was washed with three 80-cm³ portions of water to attain pH 6 in the aqueous washings, and was then dried for 2 hours over anhydrous sodium sulfate. After filtering, the ethyl acetate was removed from the organic phase by evaporation, this operation being completed under reduced pressure (approximately 70 Pa) at 60° C., and 30.3 g (i.e., a weight yield of 96% relative to the theoretical) of a viscous, orangy-brown product were collected, whose NMR spectrum was in agreement with the structure of the desired bismaleimide given at the beginning of this example. The molecular weight was on the order of 1,260.

EXAMPLE 2

The following constituents were introduced at ambient temperature into a glass reactor fitted with an anchor-type stirrer:

(i) 82 g (0.229 moles) of N,N'-4,4'-diphenylmethanebismaleimide; and (ii) 18 g (0.064 moles) of 4,4'-diamino-3,3'-diethyl-5,5'-dimethyldiphenylmethane.

Stage 1: The reactor was immersed in an oil bath preheated to 160° C., and the mixture was stirred until the ingredients introduced had melted completely and a homogeneous liquid mass has been obtained. This stage was carried out for 5 minutes.

Stage 2: The molten mixture obtained was cooled to 120° C. and 8 g of N-vinyl-2-pyrrolidone were introduced, and the entire mass was then permitted to react for 8 minutes under stirring.

20 g (0.0159 moles) of the bismaleimide containing a diorganopolysiloxane group, which was described in Example 1, were then added to the reaction mass under stirring and at 120° C.

15 g of an epoxy resin were then added to the reaction mass. continuously under stirring and maintained at 120° C., the resin being a glycidyl ether prepared by reacting epichlorohydrin with 2,2-bis(4-hydroxyphenyl)propane (or bisphenol A) and having an epoxy equivalent weight of 188; its viscosity at 25° C. was 10.5 Pa.s; it is available commercially under the registered trademark Araldite of the Ciba company, type LY 556.

Once the epoxy resin had been introduced, the liquid reaction mass obtained was immediately cast into a mold preheated to 150° C.

The prepolymer thus obtained was flexible and tacky at ambient temperature (20° C.). It had a softening point of approximately 10° C. Its viscosity at 80° C. was 4 Pa.s.

Using this prepolymer, impregnation of the hot-melt type (with solvent-free molten prepolymer) of fibrous materials based, for example, on woven carbon fiber sheets, to produce preimpregnated intermediate articles, was possible in the temperature range of from 80° to 100° C.

By casting the prepolymer immediately into a mold, as indicated above, it was possible to prepare plaques 140×100×4 mm in size, which were subjected to the following curing cycle:
60 minutes at 140° C.;
100 minutes between 140° C. and 250° C.;
16 hours at 250° C.; and
2 hours between 250° C. and 25° C.

After demolding, the plaques based on cured polymer were cut to produce test specimens of appropriate dimensions, which were used for measuring: the glass transition temperature (Tg), the flexural modulus (Mf), the flexural rupture strength (Sr), the unnotched Charpy impact strength (Si) and the tensile elongation at break (Eb).

The values determined were the following:

| | | |
|---|---|---|
| Tg: | 290° C., | |
| Mf: | at 20° C.: | 3,400 MPa, |
| | at 250° C.: | 1,500 MPa, |
| Sr: | at 20° C.: | 130 MPa, |
| | at 250° C.: | 60 MPa, |
| Si: | at 20° C.: | 15 kJ/m², |
| Eb: | at 20° C.: | 2.6%. |

For purposes of comparison, the operations described above were reproduced, but without any epoxy resin being employed. The prepolymer obtained under these conditions had a softening point of 50° C. and a viscosity at 80° C. which was on the order of 100 Pa.s. This made it difficult to produce solvent-free preimpregnated intermediate articles therefrom (the prepolymer was too viscous and the impregnation of the fibers resulted in a considerable distortion of the sheet, which militates against such application).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A heat-curable imido prepolymer having a viscosity in the molten state ranging from 0.1 Pa.s to 50 Pa.s, comprising the copolymerizate of:

(a) at least one N,N'-bismaleimide of the formula:

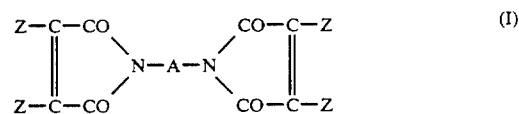

in which each of the symbols Z, which may be identical or different, is H, CH₃ or Cl; and the symbol A is a cyclohexylene, phenylene, 4-methyl-1,3-phenylene, 2-methyl-1,3-phenylene, 5-methyl-1,3-phenylene or 2,5-diethyl-3-methyl-1,4-phenylene radical, or a radical of the formula:

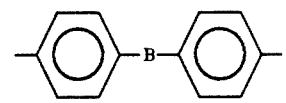

in which B is a single valence bond or one of the groups:

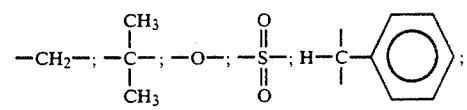

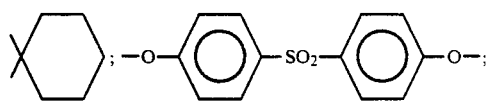

(b) at least one N,N'-bismaleimide comprising a diorganopolysiloxane moiety;
(c) at least one aromatic diprimary diamine;
(d) optionally, at least one comonomer other than a bisimide and containing one or more polymerizable carbon-carbon double bonds;
(e) optionally, a catalyst;
with the proviso that said at least one N,N'-bismaleimide comprising a diorganopolysiloxane moiety has the general formula:

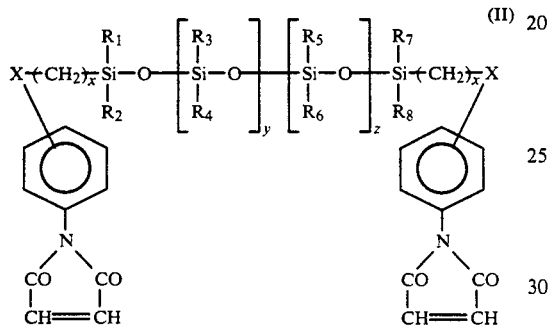
(II)

in which X, which is in an ortho, meta or para position in relation to the carbon atom of the benzene ring which is bonded to nitrogen, is a single valence bond or one of the following atoms or groups:

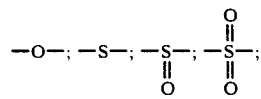

each of $R_1$, $R_2$, $R_3$, $R_4$, $R_5$, $R_6$, $R_7$ and $R_8$, which may be identical or different, is a linear or branched chain alkyl radical having from 1 to 12 carbon atoms or a substituted such alkyl radical bearing one or more chlorine, bromine or fluorine atom substituents or a —CN group, or a phenyl radical optionally substituted by one or more alkyl and/or alkoxy radicals having from 1 to 4 carbon atoms or by one or more chlorine atoms; the symbol y is an integer ranging from 2 to 8; and the symbols y and z are identical or different, whole or fractional numbers, the sum of which ranges from 0 to 100;
with the proviso that said at least one aromatic diprimary diamine (c) comprises:
(c1) a compound having the general formula:

(III)

in which the symbol D is one of the divalent radicals represented by the symbol A in the formula (I), and wherein the symbols A and D contained in the same single polymer may be identical or different;
(c2) a compound having the general formula:

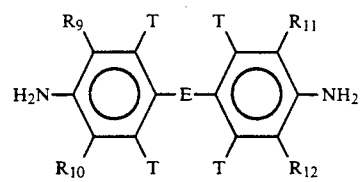
(IV)

in which each of the symbols $R_9$, $R_{10}$, $R_{11}$ and $R_{12}$, which may be identical or different, is a methyl, ethyl, propyl or isopropyl radical; each of the symbols T, which may be identical or different, is a hydrogen atom or a chlorine atom; and the symbol E is one of the divalent radicals:

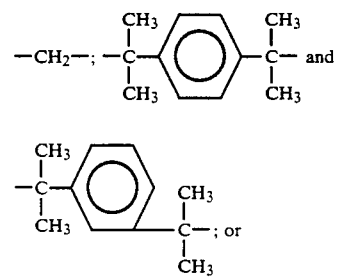

(c3) a compound having the general formula:

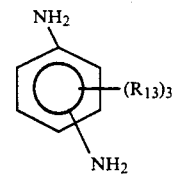
(V)

in which the amino radicals are in a meta or para position relative to each other; and each of the symbols $R_{13}$, which may be identical or different, is a methyl, ethyl, propyl or isopropyl radical;
and with the further proviso that said copolymerizate additionally includes an additive (f) which comprises either an acrylate reactant (f1) or an unhalogenated epoxy resin (f2):
said acrylate reactant (f1) comprising at least one compound of the general formula:

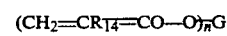
(VI)

in which the symbol $R_{14}$ is a hydrogen atom or a methyl radical; n is a whole or fractional number equal to at least 1 and not greater than 8; and the symbol G is an organic radical of valency n which comprises a linear or branched chain, saturated aliphatic radical having from 1 to 30 carbon atoms and which may contain one or more oxygen bridges and/or one or more free hydroxyl functional groups; or an aryl or arylaliphatic radical having from 6 to 150 carbon atoms and including a benzene nucleus which may be substituted by one to three alkyl radicals having from 1 to 5 carbon atoms, or a plurality of benzene nuclei optionally substituted as indicated above, bonded together by a single valence bond, an inert group or an alkylene radical having from 1 to 3 carbon atoms, with the proviso that said aromatic radical may also contain one or more bridging oxygen atoms and/or one or more free hydroxyl functional groups, and wherein the free valencies of the aromatic radical G may be satisfied by a carbon atom of an aliphatic radical and/or by a carbon atom of a benzene nucleus; and said unhalogenated epoxy resin (f2) comprising an epoxy resin having an epoxy equivalent weight ranging from 100 to 500 and which comprises a glycidyl ether prepared by reacting epichlorohydrin with a divalent polyphenol.

2. The imido prepolymer as defined by claim 1, said at least one N,N'-bismaleimide (a) comprising N,N'-meta-phenylenebismaleimide; N,N'-para-phenylenebismaleimide; N,N'-4,4'-diphenylmethanebismaleimide; N,N'-4,4'-diphenyl ether bismaleimide; N,N'-4,4'-diphenyl sulfone bismaleimide; N,N'-1,4-cyclohexylenebismaleimide; N,N'-4,4'-(1,1-diphenylcyclohexane)bismaleimide; N,N'-4,4'-(2,2-diphenylpropane)bismaleimide; N,N'-4,4'-triphenylmethanebismaleimide; N,N'-2-methyl-1,3-phenylenebismaleimide; N,N'-4-methyl-1,3-phenylenebismaleimide; N,N'-5-methyl-1,3-phenylenebismaleimide; or mixture thereof.

3. The imido prepolymer as defined by claim 1, wherein said at least one N,N'-bismaleimide (b) of formula (II):
(1) $X = -O-$; $R_1 = R_2 = R_3 = R_4 = R_5 = R_6 = R_7 = R_8 =$ linear alkyl radical having from 1 to 3 carbon atoms; $x = 2, 3$ or 4; and $y + z$ ranges from 0 to 100;
(2) $X = -O-$; $R_1 = R_2 = R_3 = R_4 = R_7 = R_8 =$ linear alkyl radical having from 1 to 3 carbon atoms; $R_5 = R_6 =$ phenyl radical; $x = 2, 3$ or 4; and $y + z$ ranges from 0 to 100;
(3) $X = -O-$; $R_1 = R_2 = R_7 = R_8 =$ linear alkyl radical having from 1 to 3 carbon atoms; $R_3 = R_4 = R_5 = R_6 =$ phenyl radical; $x = 2, 3$ or 4; and $y + z$ ranges from 0 to 100;
(4) $X = -O-$; $R_1 = R_2 = R_3 = R_5 = R_7 = R_8 =$ linear alkyl radical having from 1 to 3 carbon atoms; $R_4 = R_6 =$ phenyl radical; $x = 2, 3$ or 4; and $y + z$ ranges from 0 to 100; or
(5) $X = -O-$; $R_1 = R_3 = R_5 = R_7 =$ linear alkyl radical having from 1 to 3 carbon atoms; $R_2 = R_4 = R_6 = R_8 =$ phenyl radical; $x = 2, 3$ or 4; and $y + z$ ranges from 0 to 100.

4. The imido prepolymer as defined by claim 1, said at least one aromatic diprimary diamine (c) comprising para-phenylenediamine; meta-phenylenediamine; 4,4'-diaminodiphenylmethane; 2,2-bis(4-aminophenyl)propane; benzidine; bis(4-aminophenyl) ether; 4,4'-diaminodiphenyl sulfone; 4,4'-diamino-3,3',5,5'-tetramethyldiphenylmethane; 4,4'-diamino-3,3',5,5'-tetraethyldiphenylmethane; 4,4'-diamino-3,5-dimethyl-3',5'-diethyldiphenylmethane; 4,4'-diamino-3,3'-diethyl-5,5'-dimethyldiphenylmethane; 4,4'-diamino-3,3',5,5'-tetraisopropyldiphenylmethane; 4,4'-diamino-3,3'-diisopropyl-5,5'-dimethyldiphenylmethane; 1,4-bis(4-amino-3,5-dimethyl-α,α-dimethylbenzyl)benzene; 1,3-bis(4-amino-3,5-dimethyl-α,α-dimethylbenzyl)benzene; 1,3-diamino-2,4-diethyl-6-methylbenzene; 1,3-diamino-2-methyl-4,6-diethylbenzene; or mixture thereof.

5. The imido prepolymer as defined by claim 1, comprising an acrylate reactant (f1) selected from among:
(f1.1) a mono(meth)acrylate having the formula (VI) in which $n = 1$; and G is a monovalent organic radical of the formula:

$-(CH_2CH_2O)_m G_1$  (VII)

in which $G_1$ is a linear or branched chain alkyl radical having from 1 to 6 carbon atoms or a phenyl radical, and m is an integer equal to zero, 1, 2, 3, 4 or 5;

(f1.2) a di(meth)acrylate having the formula (VI) in which $n = 2$; and G is a divalent organic radical of the formula:

$-(CH_2CH_2O)_p G_2-(OCH_2CH_2)_q-$  (VIII)

in which $G_2$ is a linear or branched chain alkylene radical having from 2 to 9 carbon atoms and optionally comprising one or more oxygen bridges, or a radical of formula:

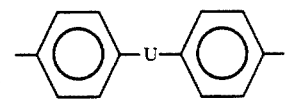

in which the symbol U is a single valence bond or one of the groups:

$-CH_2-, -CH_2-CH_2-, -CH(CH_3)CH_2-,$

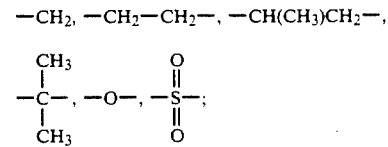

and each of the symbols p and q, which may be identical or different, is an integer equal to zero, 1, 2, 3, 4 or 5;

(f1.3) a tri- or tetra(meth)acrylate having the formula (VI) in which $n = 3$ or 4; and G is a trivalent or tetravalent organic radical derived from a linear or branched chain saturated aliphatic residue having from 3 to 20 carbon atoms and optionally comprising one or more oxygen bridges and/or one or more free hydroxyl functional groups;

(f1.4) a novolak epoxy(meth)acrylate having the following formula:

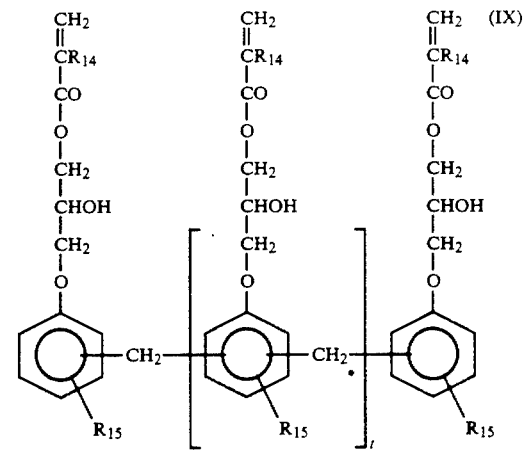

in which the symbol $R_{14}$ is as defined above in respect of the formula (VI); the symbol $R_{15}$ is a hydrogen atom or a methyl radical; and t is a whole or fractional number ranging from 0.1 to 7; and (f1.5) a mixture of a plurality of acrylates and/or methacrylates of the same single type (f1.1), (f1.2), (f1.3) or (f1.4), or a mixture of one or more acrylates and/or methacrylates of the same single type with one or more acrylates and/or methacrylates of another type.

6. The imido prepolymer as defined by claim 1, comprising at least one comonomer (d) selected from among:

(d1) a compound of the formula:

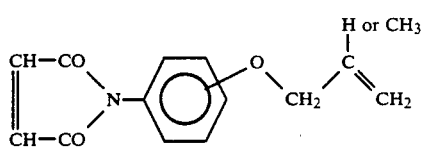
(X)

in which the allyloxy or methallyloxy radical is in an ortho, meta or para position in relation to the carbon atom of the benzene ring which is bonded to nitrogen;

(d2) a composition comprising a mixture of a compound of the formula:

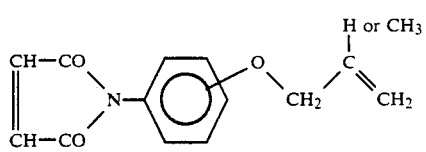
(X)

in which the allyloxy or methallyloxy radical is in an ortho, meta or para position in relation to the carbon atom of the benzene ring which is bonded to nitrogen; with at least one monosubstituted compound of the formula:

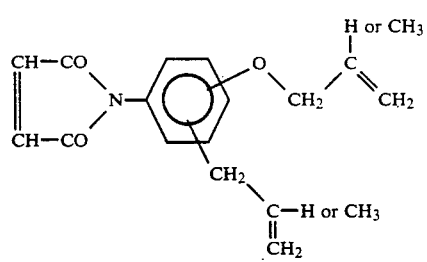
(XI)

and optionally with at least one disubstituted compound of the formula:

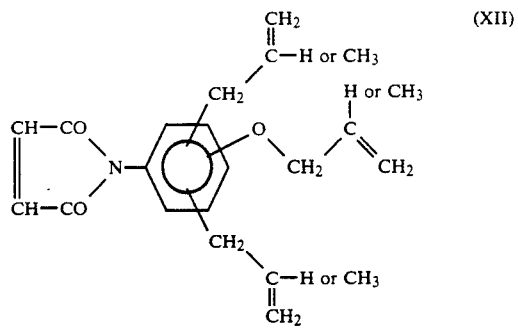
(XII)

(d3) at least one substituted heterocyclic ring comprising one or more carbon-carbon double bonds.

7. The imido prepolymer as defined by claim 1, including a catalyst (e) which comprises either a radical polymerization initiator (e1) or an imidazole compound (e2).

8. The imido prepolymer as defined by claim 1, comprising from 50% to 98% by weight of said at least one N,N'-bismaleimide (a), from 2% to 50% by weight of said at least one aromatic diprimary diamine (c), and less than 40% by weight of said at least one siloxane bismaleimide (b), each relative to the total weight of (a)+(c).

9. The imido prepolymer as defined by claim 6, comprising less than 60% by weight of said at least one comonomer (d) relative to the weight of the monomers (a)+(c).

10. The imido prepolymer as defined by claim 7, comprising from 0.01% to 1% by weight of said catalyst (e) relative to the total weight of the monomers (a)+(b)+(c)+optionally (d).

11. The imido prepolymer as defined by claim 1, comprising from 1% to 60% by weight of said constituent (f) relative to the total weight of the constituents (a)+(b)+(c)+(f)+optionally (d).

12. A process for the preparation of the imido prepolymer as defined by claim 1, comprising first mixing the monomers (a) and (c) under stirring, at a temperature ranging from 50° to 180° C., until a homogeneous liquid mixture is obtained, permitting said homogeneous liquid mixture to react, next successively adding the siloxane bismaleimide (b) and then the constituent (f) to said reacting homogeneous liquid mixture, while maintaining same stirred and at a temperature ranging from 50° to 180° C., and then immediately recovering the prepolymer thus produced.

13. A shaped article comprising the imido prepolymer as defined by claim 1.

14. The shaped article as defined by claim 13, comprising a prepreg.

15. A filament wound shaped article comprising the imido prepolymer as defined by claim 1.

* * * * *